United States Patent Office 3,440,220
Patented Apr. 22, 1969

3,440,220
ELECTRICAL CONDUCTING PROPERTIES OF ACRYLIC SUBSTRATES BY INCORPORATING THEREIN A QUINONE COMPOUND
Brian Pilling, Decatur, Ala., assignor to Monsanto Company, St. Louis, Mo., a corporation of Delaware
No Drawing. Filed Aug. 3, 1966, Ser. No. 569,820
Int. Cl. C08g 15/00
U.S. Cl. 260—65                                14 Claims

ABSTRACT OF THE DISCLOSURE

Improved electrical conducting properties are imparted to substrates comprised of a copolymer of acrylonitrile and a vinyl pyridine or an alkyl-substituted vinylpyridine by complexing a quinone with the copolymer.

---

This invention concerns a process of imparting electrical conducting properties to substrates comprised of acrylonitrile copolymers containing a vinyl-substituted tertiary heterocyclic amine, and more particularly a pyridine grouping within the polymers. More specifically, the invention relates to a process of imparting improved electrical conducting properties to substrates comprised of an acrylonitrile copolymer containing a vinyl-substituted tertiary heterocyclic amine grouping within said polymer by complexing with the amine grouping a quinone compound, and to substrates made by this process.

Work has been recently done to try and develop polymeric substrates capable of conducting electricity. Most of this work has dealt with the synthesis of conductive polymers by introducing conjugation, free radicals, charge transfer complexes, and metal ions as part of the polymeric structure. The resulting products have been either insoluble, infusible powders, or if soluble of low conductivity.

It has been discovered that the introduction of a quinone compound into an acrylonitrile copolymer containing a vinyl-substituted tertiary heterocyclic amine grouping within the copolymer, imparts improved electrical conducting properties to the copolymer.

It is therefore an object of this invention to provide a process of imparting improved electrical conducting properties to substrates comprised of an acrylonitrile copolymer containing a vinyl-substituted tertiary heterocyclic amine grouping within the copolymer.

It is also an object of this invention to provide a substrate comprised of an acrylonitrile copolymer containing a vinyl-substituted tertiary heterocyclic amine grouping within the copolymer which exhibits improved electrical conducting properties.

Other objects of this invention will become apparent as the invention is fully disclosed herein.

These and other objects of this invention are accomplished by providing a process of imparting electrical conducting properties to substrates comprised of an acrylonitrile copolymer containing a vinyl-substituted tertiary heterocyclic amine grouping within the copolymer, comprising introducing into said copolymer a quinone compound.

The term substrate as used herein is defined as a film, a woven fabric, a nonwoven fabric and any article comprised of an acrylonitrile copolymer containing a vinyl-substituted tertiary heterocyclic amine grouping within the copolymer.

As mentioned previously, the substrate is comprised of an acrylonitrile copolymer containing a vinyl-substituted tertiary heterocyclic amine grouping within the copolymer. The term "acrylonitrile copolymer" is defined as a polymer containing at least about 35% by weight of polymerized acrylonitrile units and, preferably, at least about 80% of polymerized acrylonitrile units. Useful acrylonitrile copolymers include copolymers containing acrylonitrile units, interpolymers containing acrylonitrile units and blends of the two, the polymers containing the heterocyclic amine grouping therein.

For example, the acrylonitrile copolymer can be a copolymer of from about 80 to about 98% of acrylonitrile and from about 2 to about 20% of a vinyl-substituted tertiary heterocyclic amine compound such as vinyl pyridines and the alkyl-substituted vinylpyridines, examples of the latter include 2-vinylpyridine, 4-vinylpyridine, and 2-methyl-5-vinylpyridine herein called methyl-vinylpyridine.

The acrylonitrile copolymer can also be a ternary interpolymer. Examples of ternary interpolymers include those obtained by the interpolymerization of acrylonitrile, a vinyl-substituted tertiary heterocyclic amine such as the vinyl-substituted pyridines and a mono-olefinic monomer selected from the group consisting of alpha-chloroacrylic and methacrylic acids; the acrylates such as methyl methacrylate, ethyl methacrylate, butyl methacrylate, methoxymethyl methacrylate, beta-chloroethyl methacrylate, and the corresponding esters of acrylic and alpha-chloroacrylic acids; vinyl chloride, vinyl fluoride, vinyl bromide, vinylidene chloride, 1-chloro-1-bromoethylene; methacrylonitrile; acrylamide and methacrylamide; alpha-chloroacrylamide and monoalkyl substitution products thereof; methyl vinyl ketone; vinyl carboxylate such as vinyl acetate, vinyl chloroacetate, vinyl propionate and vinyl stearate; N-vinylimides such as N-vinyl phthalimide and N-vinyl succinimide; methylene malonic esters; itaconic acid and itaconic esters; N-vinyl carbazole; vinyl furane; alkyl vinyl esters; vinyl sulfonic acids; ethylene alpha,beta-dicarboxylic acids and their anhydrides and derivatives thereof such as diethylcitraconate, diethylmesaconate; styrene; vinyl naphthalene; 1-vinylimidazole and alkyl-substituted 1-vinylimidazoles such as 5-methyl-1-vinylimidazole; and other similar monoolefinic copolymerizable materials. A preferred species of the ternary polymer contains from about 80 to about 98% of acrylonitrile, from about 1 to about 10% of a vinyl-substituted pyridine and from about 1 to about 18% of a copolymerizable mono-olefinic material selected from the group consisting of methacrylonitrile, vinyl acetate, methyl methacrylate, vinyl chloride and vinylidine chloride.

The acrylonitrile copolymer can also be a blend of two or more copolymers containing acrylonitrile and one of the above enumerated mono-olefinic monomers, providing at least one of the copolymers contains a vinyl-substituted tertiary heterocyclic amine grouping within the copolymer. An example of such a copolymer is a polymer blend containing 80 to 95% of a copolymer of 80 to about 98% of acrylonitrile and from about 2 to about 20% of a vinyl acetate and about 5% to about 20% of a copolymer of from about 25% to about 75% of acrylonitrile and from about 25% to about 75% of a vinyl-substituted tertiary heterocyclic amine compound such as methyl vinylpyridine. The acrylonitrile copolymer can also be a blend of one or more copolymers containing acrylonitrile and one of the above enumerated mono-olefinic monomers and a polymer such as a polyvinyl halide, providing the copolymer contains a vinyl-substituted tertiary heterocyclic amine grouping and the blend contains at least about 70% of acrylonitrile units. For example, the acrylonitrile copolymer can be a blend containing from about 70 to about 90% of a copolymer of from about 80 to about 98% of acrylonitrile and from about 2% to about 20% of vinyl acetate, from about 5% to about 30% of a copolymer of from about 25% to and 75% of acrylonitrile and from about 25% to about 75% of a vinyl-substituted pyridine, and from about 5% to about 20% of a polymer of a vinyl-substituted halide. When the acrylonitrile copolymer is a blend, it is preferred that the blend be composed of from about 70 to about 90% of a copolymer of from about 80% to about 98% of acrylonitrile and from about 2 to about 20% of another mono-olefinic monomer such as vinyl acetate, from about 5 to about 20% of a copolymer of from about 30 to about 90% of a vinyl-substituted tertiary heterocyclic amine such as vinyl pyridine or methyl-vinyl pyridine and from about 10 to about 70% of acrylonitrile and from about 5 to about 20% of a polyvinyl halide such as polyvinyl chloride or polyvinyl bromide, the blend having an overall vinyl-substituted tertiary heterocycic amine content of from about 2 to about 10% based on the weight of the blend.

The quinone compounds useful with the invention include halogenated quinone compounds. The quinone compound can have aryl groupings, alkyl groupings and halogen groupings attached to the alicyclic ring. Examples of such compounds include p-benzoquinone, o-benzoquinone, diphenoquinone, 1,2-, 1,4-, 2,3-, and 2,6-naphthoquinone, anthraquinone, phenathrenequinone 1,2-, 1,4-, 2,3-, ad 3,4-phenanthrenequinone, trichlorobenzoquinone and chloranil. Preferred quinone compounds include choranil, diphenoquinone and p-benzoquione. Where halogenated quinone compounds are used, for example chloranil and like compounds, the incorporation of a minor amount of an alkali metal salt of a lower organic acid, such as sodium acetate, is sometimes beneficial to improve the electrical conducting properties of the substrate.

The exact characteristic or nature of the final product effected by the quinone compound and the vinyl-substituted tertiary heterocyclic amine grouping within the acrylonitrile copolymer is now known. It is though that the significant effect of the quinone compound is the quaternization of the vinyl-substituted tertiary heterocyclic amine grouping by complex formation, the result of which imparts improved electrical conducting properties to dyed, undyed or pigmented substrates comprised of the herein disclosed acrylonitrile copolymers.

The amount of the quinone compound useful in the invention should be within the range of from about 1.5% to about 10%, and preferably from about 3% to about 7%, the percents based on the weight of the acrylonitrile copolymer and the copolymer contianing from about 1% to about 12% by weight of a vinyl-substituted tertiary heterocyclic amine grouping. On a molar ratio, it is preferred that the quinone compound to the heterocyclic amine grouping be within the range of from about 0.01:0.075 to about 1:1, respectively. More preferably, a molar ration of 0.02 mole of the quinone compound to 0.05 mole of the heterocyclic amine grouping is useful to give improved electrical conducting properties to the substrate.

The quinone compound should be sufficiently mixed with the acrylonitrile copolymer so that the quinone molecule can attach itself to the vinyl-substituted tertiary heterocyclic amine grouping within the acrylonitrile copolymer. For example, the quinone compound can be introduced into the acrylonitrile copolymer by mixing the quinone compound with the copolymer in solution at ambient temperature for about 30 minutes. Higher temperatures are different mixing times are also useful within the invention.

The substrate can be colored with an acid dye. disperse dye or basic dye. The substrate can also be pigmented to give it color, or the substrate can be of a natural color, i.e., without being dyed.

The following examples are presented to specifically illustrate working embodiments of the invention. Samples of the examples are cast into films by depositing a 0.015″ thick layer of a polymeric solution onto a clean glass plate. The glass plate is then placed in an oven and the solvent within the solution is evaporated. The film is then cut to a strip measuring 6″ long by ½″ to 1″ wide. Electrical conducting properties of the sample are then determined by placing the strip and connecting the ends thereof between two electrodes of a Rothschild static volt meter, type R–1019, Ser. No. 6401, made by Elektronische, Mess- und Steuergerate, Zurich 2, Switzerland. An electrical charge of 100 volts is induced into the strip. The source of the charge is removed and the time is measured that it takes for the 100 volts to dissipate to 50 volts, referred to herein as static dissipation time for half decay. This time is measured in minutes or seconds and indicates the characteristic of the acrylic samples to dissipate charges of electricity. Any half decay time in excess of 3 minutes indicates a poor electrical conducting characteristic. Percents, where used, are based on weight unless otherwise specified.

EXAMPLE I

To samples containing a polymeric solution of dimethyl acetamide and 15%, percent based on weight per volume, of an acrylonitrile copolymer blend containing 88% of a copolymer being 93% of acrylonitrile and 7% vinyl acetate, and 12% of a copolymer being 50% acrylonitrile and 50% methyl vinylpyridine, there is added the below indicated compositions. The resulting solutions are mixed for 30 minutes at room temperature. Where a dye is indicated in the composition, the solution is mixed an additional 10 minutes at room temperature after the dye is added. A 0.015″ thick film of each sample is cast on a clean glass plate by using a Gardner knife. Thereafter, the films are dried in an oven at 80°–85° C. for 30 minutes. The films are tested for static dissipation. Table 1 indicates the compositions and the results of the tests (control samples, i.e., samples that have not been treated with an alicylic dione compound are presented for comparison purposes):

TABLE 1

| Sample | Composition | Static dissipation time for half decay (seconds) |
|---|---|---|
| 1 (control) | | [1] >3 |
| 2 | 5% chloranil | 16 |
| 3 | 5% chloranil+1% sodium acetate | 3.5 |
| 4 (control-dyed) | 1% C.I. Acid Blue 104 | [1] >3 |
| 5 | 5% chloranil+1% C.I. Acid Blue 104 | 6 |
| 6 | 5% chloranil+1% sodium acetate+1% C.I. Acid Blue 104. | 11 |

[1] Minutes.

The above results indicate the significance of the invention for imparting electrical conducting properties to uncolored and colored substrates.

EXAMPLE II

The procedure of Example I is repeated except the polymeric solutions contain dimethyl formamide instead of the dimethyl acetamide. Table 2 indicates the composition of each sample and the results of the static dissipation tests:

TABLE 2

| Sample | Composition | Static dissipation time for half decay (seconds) |
|---|---|---|
| 1 | 5% chloranil | 15 |
| 2 | 5% diphenoquinone | 14 |
| 3 | 5% p-benzoquinone | 70 |
| 4 | 5% chloranil+1% sodium acetate | 11 |

EXAMPLE III

The procedure of Example I is repeated except the polymeric solutions contain dimethyl formamide and, after the below indicated compositions are added to the solution and mixed for 30 minutes at room temperature, a solution containing dimethyl formamide and 1% (the percent based on the weight of the polymeric blend) of C.I. Acid Blue 104 is added to the above solution and is agitated at room temperature for 10 minutes. Films of each sample are cast and are then tested for static dissipation. The results of the test and the compositions used in each sample are indicated in the below table, Table 3:

TABLE 3

| Sample | Composition | Static dissipation time for half decay (seconds) |
|---|---|---|
| 1 (control) | | [1] >3 |
| 2 | 5% diphenoquinone | 4 |
| 3 | 5% p-benzoquinone | 60 |
| 4 | 5% chloranil | 15 |

[1] Minutes.

EXAMPLE IV

The procedure of Example I is repeated except the polymeric solutions contain an acrylonitrile copolymer having a methyl vinylpyridine content of about 5.9%, this percent determined spectroscopically and the percent based on the weight of the polymer. The acrylonitrile copolymer is known in the trade as Creslan, a trademark of American Cyanamid Co., Fibers Division, New York, N.Y. The compositions of the samples are indicated below in Table 4, and, where a dye is indicated in the composition, the polymeric solution is mixed for an additional 10 minutes at room temperature. Control samples, i.e., samples which have not been treated with an alicyclic dione compound, are presented for comparison purposes. Table 4 indicates the compositions of the samples and the results of the static dissipation test:

TABLE 4

| Sample | Composition | Static dissipation time for half decay (seconds) |
|---|---|---|
| 1 (control) | | [1] >3 |
| 2 | 5% chloranil | 100 |
| 3 | 5% chloranil+1% sodium acetate | 21 |
| 4 (control-dyed) | 1% C.I. Acid Blue 104 | [1] >3 |
| 5 | 1% C.I. Acid Blue 140+5% chloranil | 70 |
| 6 | 1% C.I. Acid Blue 104+5% chloranil+1% sodium acetate | 15 |

[1] Minutes.

Although the above examples are presented to specifically illustrate working embodiments of the invention, it is acknowledged that other acrylonitrile copolymer substrates, alicyclic dione compounds, dyes, and operating conditions can be used and are applicable without departing from the spirit and scope of this invention.

What is claimed is:

1. A process of imparting electrical conducting properties to an article comprised of a copolymer of acrylonitrile and a member of the group consisting of vinylpyridines and alkyl-substituted vinylpyridines, comprising complexing by mixing with said copolymer a quinone and forming said article.

2. The process of claim 1 wherein the acrylonitrile copolymer contains from about 1% to about 12% of a pyridine grouping within said copolymer, the percents based on the weight of the copolymer.

3. The process of claim 1 wherein said vinylpyridine is methyl vinylpyridine.

4. The process of claim 1 wherein said quinone is diphenoquinone.

5. The process of claim 1 wherein said quinone is p-benzoquinone.

6. The process of claim 1 wherein said quinone is halogenated.

7. The process of claim 1 wherein from about 1.5% to about 10% of the quinone compound is complexed with the copolymer, the percents based on the weight of the copolymer.

8. A process of imparting electrical conducting properties to an article comprised of a copolymer of acrylonitrile and a member of the group consisting of vinylpyridines and alkyl-substituted vinylpyridines, said copolymer containing from about 1% to about 12% of a pyridine grouping within said copolymer, comprising complexing by mixing with said copolymer from about 1.5% to about 10% of a quinone compound, the percents being based on the weight of the copolymer, and forming said article.

9. The process of claim 8 wherein said vinylpyridine is methyl vinylpyridine.

10. The process of claim 8 wherein from about 3% to about 7% of the quinone compound is complexed with the copolymer.

11. The process of claim 8 wherein the quinone compound is chloranil.

12. The process of claim 8 wherein the quinone compound is diphenoquinone.

13. The process of claim 8 wherein the quinone compound is p-benzoquinone.

14. An article having improved electrical conducting properties, the article comprised of a copolymer of acrylonitrile and a member of the group consisting of vinylpyridines and alkyl-substituted vinylpyridines in an amount whereby said copolymer contains from about 1% to about 12% of a pyridine grouping within said copolymer, and from about 1.5% to about 10% of a quinone compound, the percents being based on the weight of the copolymer.

References Cited

UNITED STATES PATENTS 2,757,154  7/1956  Beaman _____ 260—30.2
2,775,567  12/1956  Basdekis _____ 260—29.6

WILLIAM H. SHORT, *Primary Examiner.*

L. L. LEE, *Assistant Examiner.*

U.S. Cl. X.R.

260—85.5